Oct. 3, 1961 C. S. LONGSTREET 3,002,350
FUEL CONTROL DEVICE FOR COMBUSTION ENGINES
HAVING MEANS FOR AVOIDING COMPRESSOR STALL
Filed Nov. 5, 1956 4 Sheets-Sheet 1

INVENTOR.
CHARLES S. LONGSTREET.
BY Cecil J Arens
ATTORNEY.

INVENTOR.
CHARLES S. LONGSTREET.

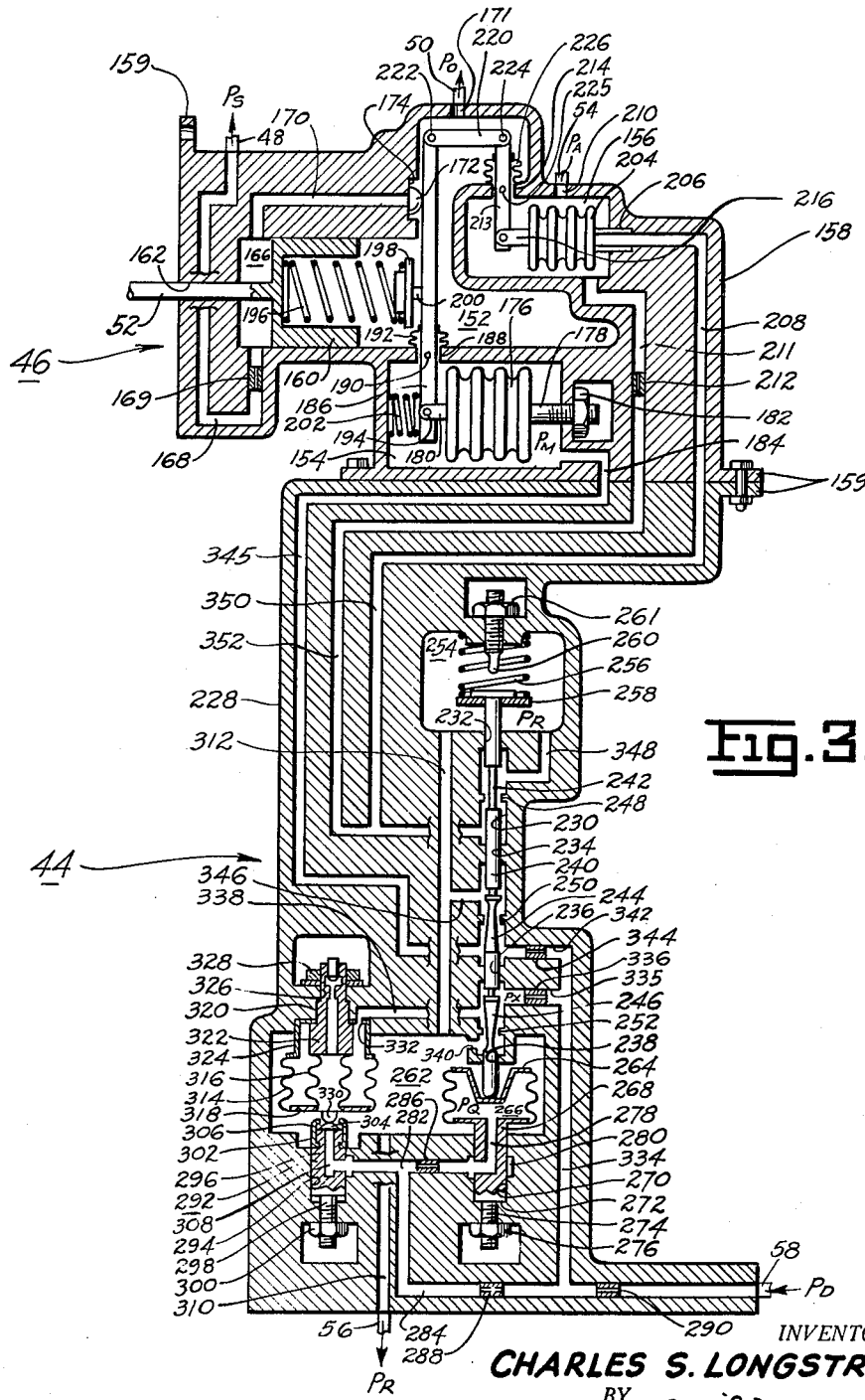

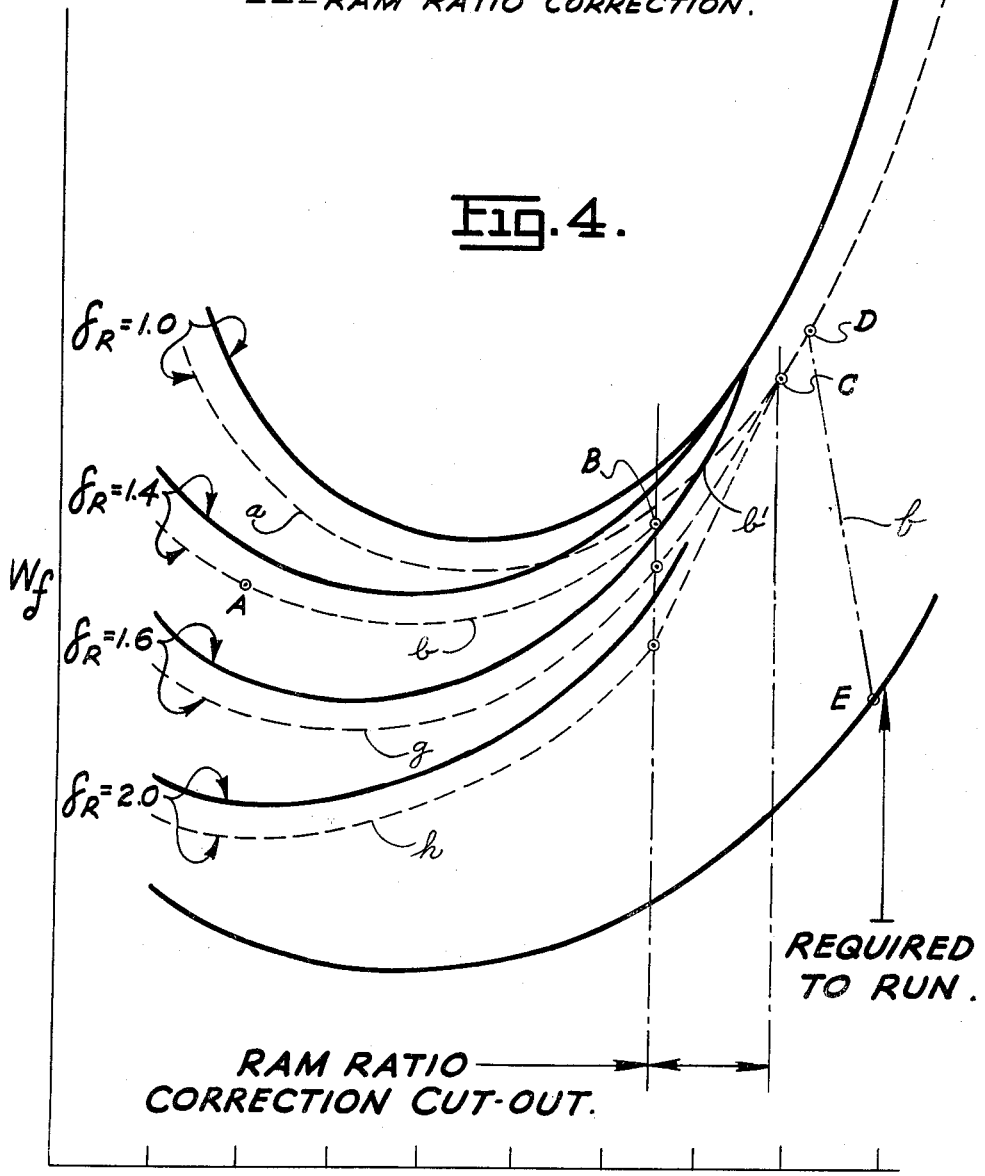

3,002,350
FUEL CONTROL DEVICE FOR COMBUSTION ENGINES HAVING MEANS FOR AVOIDING COMPRESSOR STALL
Charles S. Longstreet, South Bend, Ind., assignor to The Bendix Corporation, a corporation of Delaware
Filed Nov. 5, 1956, Ser. No. 620,294
11 Claims. (Cl. 60—39.28)

This invention relates to fluid flow regulating systems and more particularly to a device for controlling the metered fuel to the engine in such a manner as to avoid a region of compressor instability.

The most common gas turbine engine is of the one compressor type commonly known in the art as a "single spool" engine.

For several years manufacturers of "single spool" gas turbine engines and fuel controls for these engines have been plagued with a severe limitation on acceleration caused by compressor instability or stall. Many types of fuel controls have been devised to cope with this problem. Most controls contemplate, in one way or another, scheduling the flow of fuel to the engine in such manner as to avoid the compressor stall region. Another approach to the problem has been to build engines in which two compressors are used, each being permitted to rotate independently of the other. Engines having two compressors are commonly known in the art as "twin spool" engines. The main purpose of this so-called "twin spool" engine is to improve the stall characteristics of the composite compressor and this purpose is accomplished if the ratio of the speeds of the separate compressors do not vary beyond acceptable limits.

A disadvantage common to both types of engines arises as a result of variations in compressor inlet ram air pressure brought about by changes in flight speed. The variation causes a shift in the compressor stall characteristics of the engine such that, if the fuel flow to the engine is not corrected accordingly, the engine may enter into a region of compressor instability thereby subjecting the entire structure to extremely dangerous high operating temperatures and stress. Of the two types of engines, the twin spool engine is most susceptible to the above mentioned ram air pressure parameter.

It is therefore an object of this invention to provide a fuel metering system which meters fuel to an engine in accordance with the relation $$W_f = KN\left[P_M - CP_A\left(\frac{P_R}{P_A} - 1\right)\right]$$

when the engine is operating below a predetermined condition within its speed range and which meters fuel to the engine in accordance with the relation $W_f = KNP_M$ when the engine is operating above a predetermined engine operating condition within its speed range.

An object of this invention is to provide fuel flow regulating apparatus for a gas turbine engine which will vary the fuel flow to the engine to avoid compressor surge or stall.

A main object of this invention is to provide fuel flow regulating apparatus for a gas turbine engine which will vary the fuel flow to avoid compressor surge or stall in a single spool or a twin spool gas turbine engine.

Another object of this invention is to provide apparatus for varying the fuel flow to a gas turbine engine as a function of compressor ram air pressure and ambient air pressure.

A further object of this invention is to provide fuel flow control apparatus for a gas turbine engine which will operate within predetermined limits within the speed range of the engine to avoid conditions of compressor instability.

A still further object of this invention is to provide fuel flow control apparatus for a gas turbine engine which will meter fuel in accordance with a relationship between ram intake air pressure and ambient air pressure to avoid compressor instability at any altitude within the operating range of the engine.

Other objects and advantages will be apparent from the following description taken in connection with the accompanying drawings, wherein:

FIGURE 3 is a sectional schematic of the present invention shown removed from the main fuel control and drawn in enlarged form; and FIGURE 4 shows a series of curves having a $$W_f V_s \frac{P_D}{P_R}$$

relationship and the effect thereon of the ram ratio correction to avoid compressor instability.

Figure 1:
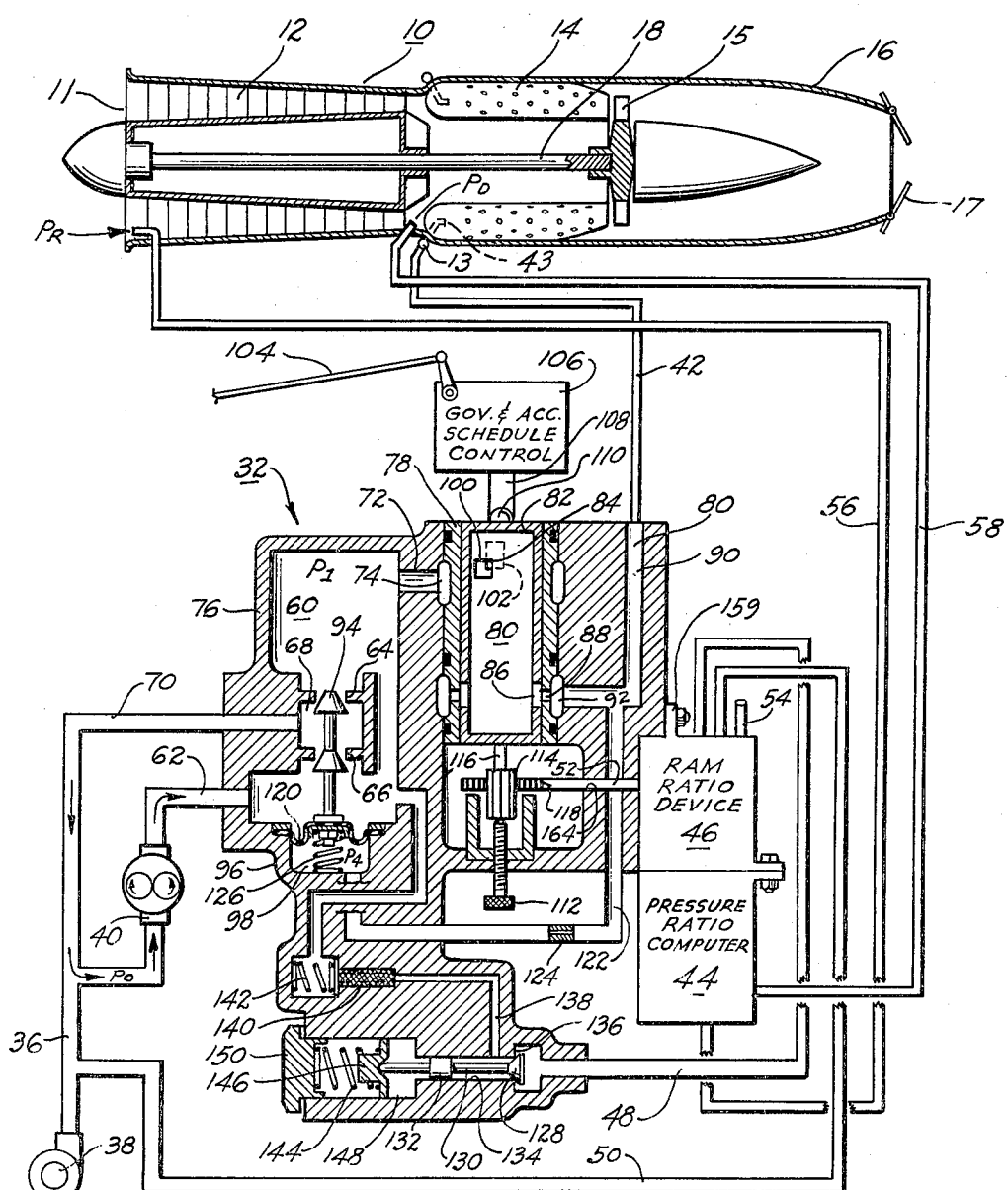
FIGURES 1 and 2 represent schematic illustrations of a single spool and a twin spool gas turbine engine, respectively, and a fuel system arranged with each in accordance with the invention.

Referring more specifically to the drawings, wherein like numerals are used to designate like parts throughout the various figures, in FIGURE 1, numeral 10 represents a single spool gas turbine engine having an air intake 11, a compressor 12, a main fuel supply manifold 13, a combustion chamber 14, a turbine 15, an exhaust pipe 16, and an adjustable exhaust nozzle 17. Air flowing through the air intake is received and compressed by the compressor from which it flows to the combustion chamber where it is mixed with fuel and ignited, the products of combustion passing through the turbine which is drivably connected to the compressor through a shaft 18. The products of combustion exit from the turbine and flow through the exhaust pipe and nozzle to the atmosphere to provide thrust for the engine.

Figure 2:
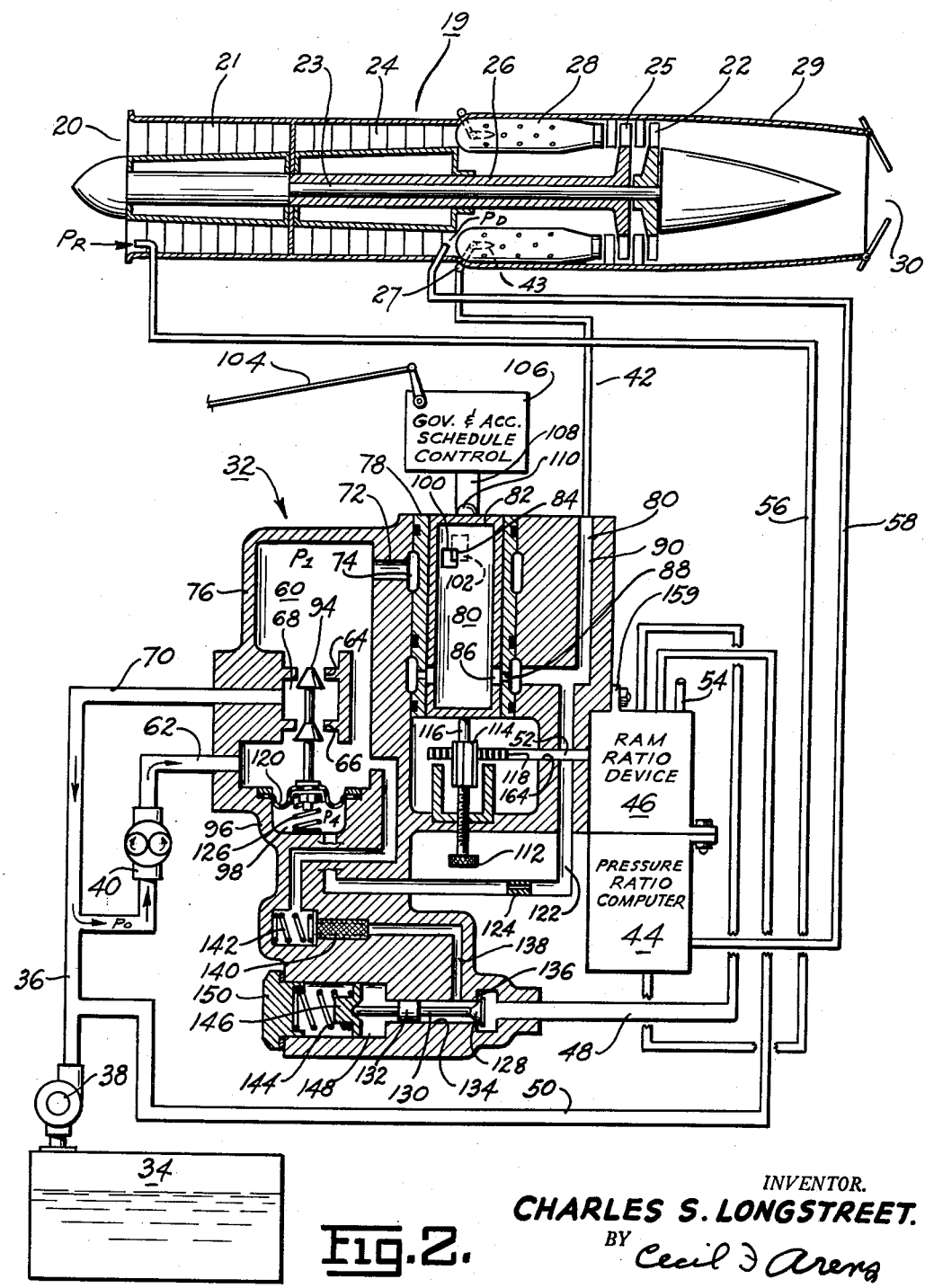

Referring to FIGURE 2, numeral 19 represents a two-spool gas turbine engine having an air intake 20, a low pressure compressor 21, a rear turbine 22 drivably connected to the low pressure compressor 21 through a shaft 23, a high pressure compressor 24, a forward turbine 25 drivably connected to the high pressure compressor 24 by means of a hollow shaft 26, a main fuel supply manifold 27, a combustion chamber 28, an exhaust pipe 29 and a nozzle 30. Air flowing through the air intake is received and compressed by the low pressure compressor 21 and the high pressure compressor 24 in that order subsequently flowing from the high pressure compressor to the combustion chamber where it is mixed with fuel and ignited, the products of combustion passing through the turbines 25 and 22 to produce sufficient force for driving the compressors. The products of combustion exit from the rear turbine and flow through the exhaust pipe and nozzle to the atmosphere to provide thrust for the engine.

Referring to FIGURES 1 and 2 a main fuel control 32 receives pressurized fuel from a supply tank 34 through a conduit 36 having a boost pump 38 and a main fuel pump 40 disposed therein. An outlet conduit 42 delivers metered fuel from the main fuel control 32 to the main fuel supply manifold 13 or 27 from whch the fuel flows to the combustion chamber 14 or 28 via fuel nozzles 43. The present invention, schematically shown at 44 and 46 and labeled pressure-ratio computer and ram ratio device, respectively. The ram ratio device 46 is connected with the main fuel control 32 through conduits 48 and 50 and rod 52 and communicates with atmospheric pressure through conduit 54. The pressure ratio computer device 44 communicates with compressor inlet and discharge pressures, $P_R$ and $P_D$, through conduits 56 and 58 respectively.

Fuel at pressure $P_1$ is received in chamber 60 from the fuel pump 40 through inlet conduit 62. The total flow of fluid into chamber 60 is divided into two main flow paths, the first of which returns a portion of the fuel to the inlet of fuel pump 40 by way of by-pass ports 64 and 66, a by-pass chamber 68 and a conduit 70, the second of which conducts the fuel to the main fuel supply manifold 13 (see FIGURE 1) or 27 (see FIGURE 2) by way of a conduit 72, and inlet annulus 74 formed between housing 76 and a fixed cylindrical sleeve member 78, a chamber 80 formed by an axially and rotatably actuable hollow cylindrical metering valve 82 and connected to annulus 74 by a main metering port 84, valve and sleeve outlet ports 86 and 88, a discharge conduit 90 connected to said ports by an outlet annulus 92 and conduit 42. The by-pass ports 64 and 66 are controlled by a double landed poppet valve 94 which is controlled to maintain a constant pressure differential across metering port 84 by a regulator unit 96 which includes a chamber 98.

A square port 100 formed in the wall of metering valve 82 is adapted to variably register with a square port 102 formed in the wall of the fixed sleeve member 78 to vary the effective area of the metering port 84 which connects the inlet annulus 74 to the valve chamber 80. The metering port 84 is either square or rectangular in shape and the area thereof is determined by dimensions A and B; dimension A is varied whenever the axial position of the metering valve changes; and dimension B is varied whenever the rotational position of the metering valve changes. Mechanism for controlling the axial and rotational positions of valve 82, which is herein shown somewhat diagrammatically, is disclosed in detail and in various embodiments in U.S. application Serial Nos. 248,402, filed September 26, 1951, now abandoned, in the name of H. C. Zeisloft and 499,432, filed April 5, 1955, in the names of H. J. Williams, B. J. Ryder and F. R. Rogers (common assignee).

An engine all-speed governor control responsive to engine speed and the position of pilot controlled lever 104, and an acceleration fuel scheduling control responsive to engine speed and compressor inlet temperature, are shown in diagrammatic form at 106, said governor and acceleration controls being arranged in mutually overriding relation such that that one which allows the least quantity of fuel to flow through metering port 84 controls the A dimension thereof. The governor portion of control 106 controls the axial position of valve 82, or A dimension of port 84, during governor cut-off and engine equilibrium operation, whereas the acceleration scheduling portion of said control, which may include a contoured three dimensional cam actuable as a function of engine speed and compressor inlet temperature, varies the axial position or A dimension of the metering valve during an acceleration of the engine in accordance with a predetermined schedule. The control 106 is connected to the metering valve by a rod 108 and a ball joint 110. An adjustable minimum flow stop 112 which is mounted in the housing 76, is shown abutting one end of a pinion 114 which is connected to the valve 82 by a rod 116. Abutment between the minimum flow stop 112 and the pinion 114 exists only during a deceleration of the engine, which may be initiated by resetting the governor portion of control 84 to a lower than existing speed. Initiation of an engine deceleration results in a closing movement of the valve 82 to the position shown; the resulting fixed minimum A dimension of port 84 obtains until such time as governor action returns the engine to equilibrium operation at the new selected speed.

The rotational position of metering valve 82 and the B dimension of port 84 are controlled by the pressure ratio computer 44 and ram ratio device 46, the ram ratio device being operably connected to metering valve 82 through rod member 52 having a rack 118 formed thereon which engages pinion 114, the action of which will be hereinafter described in detail in connection with FIGURE 2.

The by-pass valve 94 is controlled by a $P_1-P_4$ differential acting across a by-pass valve diaphragm 120. The by-pass valve serves to maintain a constant $P_1-P_4$ differential across metering valve 82 irrespective of the area provided by metering port 84. Chamber 98 communicates with discharge conduit 90 through a passage 122 having a restriction 124 therein. The restriction 124 serves to control the sensitivity of by-pass valve 94. A spring 126 acts as a preload on by-pass valve 94 and coacts with the pressure $P_4$ on the lower side of diaphragm 120 in opposition to pressure $P_1$ on the upper side of diaphragm 120. A decrease in pressure $P_4$ on the lower side of diaphragm 120 results in a higher $P_1-P_4$ differential thereacross and by-pass valve 94 is caused to move towards an open position thus diverting sufficient fluid through ports 64 and 66, chamber 68, and conduit 70 back to the pump inlet to re-establish the correct $P_1-P_4$ differential across metering valve 82. If $P_4$ should increase, the $P_1-P_4$ differential across diaphragm 120 would decrease and by-pass valve 94 would move towards a closed position thus increasing the flow of the metering valve 82 until the $P_1-P_4$ differential thereacross is re-established to its correct value.

A fuel servo pressure regulating valve 128 having an elongated stem 130 and a piston member 132 formed thereon is slidably contained in a bore 134 in housing 76. The valve 128 cooperates with a valve seat 136 formed in bore 134 to control the flow of fuel between a conduit 138 connecting chamber 60 and outlet conduit 48. A filter member 140 is disposed in conduit 138 and held in position by a spring 142. The valve 128 is actuated by a spring 144 interposed between a spring retainer 146 slidably contained by a chamber 148 at one end of bore 134 and an adjustable plug 150 threadedly engaged with housing 76. During operation a constant supply of fuel at servo pressure $P_s$ is maintained to the ram ratio device for the operation of various servo mechanisms associated therewith by valve 128 according to the predetermined spring 144 force, which force is balanced by fuel at $P_1$ pressure acting against piston member 132. The passage 50 connected between the ram ratio device and the fuel pump inlet delivers fuel in excess of servo pressure demand to the fuel pump inlet.

The ram ratio device 46 is adapted to receive a plurality of pressures controlled by the pressure ratio computer 44 and to respond to these pressures in such a manner as to vary the rotational position of the valve member 82 as a function of compressor discharge pressure and the aforementioned ratio of ram intake air pressure to ambient air pressure. FIGURE 3 shows the pressure ratio computer 44 and ram ratio device 46 removed from the main fuel control and drawn in enlarged form.

As shown in FIGURE 3, a plurality of chambers 152, 154 and 156 are contained in a casing 158 which is adapted through any suitable means such as lugs 159 to be securely attached to the main fuel control housing 76. A portion of chamber 152 is arranged to slidably receive a cylindrical cup-shaped piston 160 having rod 52 extending therefrom through openings 162 and 164 in casing 158 and main fuel control housing 76 (see FIGURE 1) respectively to engage valve member 82, the rod 52 having a sliding engagement with said openings. A variable volume chamber 166 partially formed by the closed end of piston 160 receives fuel through inlet passage 168 which is connected to conduit 48. A restriction 169 is secured in inlet passage 168 to control the pressure level sensitivity in chamber 166. An outlet passage 170 connects variable volume chamber 166 with chamber 152 which is connected to the fuel pump inlet via a passage 171 and passage 50 (see FIGURE 1 or 2). The servo pressure $P_s'$ in variable volume chamber 166 is controlled by a flapper valve 172 which coacts with a valve seat 174 formed at the downstream end of passage 170. A sealed bellows member 176 having a threaded extension 178 extending from one end and a link 180 extending from an opposite end is contained by chamber 154. The threaded extension 178 is threadedly engaged with casing 158 and with a nut 182 which locks the extension at any desired position. A passage 184 in casing 158 communicates chamber 154 with a modulated compressor discharge pressure $P_M$ circuit in the pressure ratio computer 44. A lever 186 extending through an opening 188 in casing 158 is pivoted on a pin 190 engaged with casing 158. A flexible sealing member 192 is securely attached to casing 158 and to lever 186 to prevent leakage between chambers 152 and 154. One end of lever 186 is pivotally attached to link 180 by a pin 194 and the opposite end of lever 186 is arranged to contact flapper valve 172. A spring 196 is interposed between piston 160 and a spring retainer 198 having a centrally located button member 200 which engages lever 186. A spring 202 interposed between casing 158 and the bellows end of lever 186 acts to load the lever in opposition to the spring 196 force and the bellows 176 force. A bellows member 204 closed at one end and having tubular extension 206 secured to the other end is contained by chamber 156. The tubular extension 206 is securely mounted in casing 158 and communicates the interior of bellows member 204 with a passage 208 having a fluid connection with a ram air pressure $P_R$ circuit of the pressure ratio computer 44. A passage 210 communicates chamber 156 with static or ambient air pressure $P_A$. A passage 211 contains a restriction 212 and connects the chamber 156 with the ram air pressure $P_R$ circuit in the pressure ratio computer 44.

A lever 213 extending through an opening 214 in casing 158 is pivotally engaged at one end with an extension 216 secured to the closed end of bellows 204. The opposite end of the lever 213 is connected to lever 186 via a link 220 pivotally secured to the levers 186 and 213 by pins 222 and 224, respectively. The lever 213 is mounted for rotation on a pin 225 secured to casing 158. A flexible sealing member 226 is securely attached to casing 158 and lever 213 to prevent leakage between chambers 156 and 152.

The pressure ratio computer 44 provides for control of the modulated compressor discharge pressure $P_M$ and ram air pressure as a function of compressor pressure ratio $P_D/P_R$. A casing 228 is securely attached to casing 158 through any suitable means such as the lugs 159 and is provided with a bore 230 having a plurality of reduced diameter sections 232, 234, 236 and 238 within which a valve member 240 is slidably contained. The valve member 240 is provided with contoured portions 242, 244 and 246 which register with orifices 248, 250 and 252 respectively, each of which orifices is formed by a reduced diameter portion of bore 230. The contoured portion 242 is a constant diameter reduced portion of the valve whereas the contoured portions 244 and 246 vary in diameter along their axial length. A chamber 254 contains a spring 256 interposed between casing 228 and a spring retainer 258 fixedly secured to the end of valve member 240. A stop member 260 adjustably threaded with casing 228 is arranged to engage the spring retainer 258 thus limiting the movement of valve member 240 in that direction. A nut 261 is provided to lock the stop member 260 in any desired position. The opposite end of valve member 240 extends into a chamber 262 to engage a concave cover plate 264 which is securely attached to one end of a bellows member 266 by any suitable means which will provide an airtight seal. The opposite end of the bellows member 266 is secured to a flanged member 268 by any suitable means which will provide an airtight seal. The flanged member 268 extends into a bore 270 into engagement with a shoulder 272. A threaded portion 274 of flanged member 268 is engaged with a nut 276 which locks the member in position against shoulder 272. A passage 278 in flanged member 268 communicates the interior of bellows member 266 with an annular passage 280 in casing 228 which in turn communicates with compressor discharge pressure $P_D$ via passages 282 and 284. A restriction 286 is secured in passage 282 and restrictions 288 and 290 are secured in passage 284. A valve assembly 292 contained in a bore 294 in casing 228 is arranged to control the compressor discharge pressure $P_D$ which communicates with bellows member 266. The valve assembly 292 includes a valve body 296 adjustably located in bore 294 by means of an extension 298 threadedly engaged with casing 228 and locked position by a nut 300 threadedly engaged therewith. A valve seat 302 is formed at the opposite end of valve body 296 and a flapper valve 304 is adapted to coact therewith. The flapper valve 304 is held adjacent to the valve seat by a retaining member 306 removably secured to valve body 296. A passage 308 formed in valve body 296 connects valve seat 302 with passage 282. A passage 310 connects chamber 262 with conduit 56 (see FIGURE 1). A passage 312 connects chambers 262 and 254. An outer bellows 314 and an evacuated inner bellows 316 concentrically arranged are housed within chamber 262. A cover plate 318 is secured to one end of bellows 314 and 316 in a sealed engagement. A tubular member 320 is fixedly attached in a sealed engagement to the opposite end of bellows 316 by means of an inner shoulder 322 formed thereon. An annular shaped flanged member 324 is fixedly secured to bellows 314 in a sealed engagement and is clamped between casing 228 and the tubular member 320 which extends through a bore 326 in casing 228. A lock nut 328 threadedly engaged with the end of the tubular member 320 locks the member securely in position. A centrally located button 330 formed on cover plate 318 is arranged to engage flapper valve 304. Compressor discharge pressure $P_D$ is communicated to the interior of outer bellows 314 through an opening 332 in flanged member 324 via passage 58 (see FIGURE 1 or 2), passage 284, passage 334, branch passage 335 and restriction 336, bore 230 and passage 338. The bore 230 further communicates with chamber 262 via orifice 252 and a passage 340.

Compressor discharge pressure $P_D$ is communicated to modulated pressure $P_m$ chamber 154 from passage 334 by way of a branch passage 342 and restriction 344, bore 230 and passages 345 and 184. Branch passage 342 is also vented to chamber 262 by way of bore 230, orifice 250, a passage 346 and passage 312. Compressor inlet ram air pressure $P_R$ is transmitted from chamber 262 to passage 208 via passage 312, chamber 254, passage 348, bore 230, orifice 248 and passage 350. A branch passage 352 connects passage 350 with passage 211.

The valve member 240 is controlled by bellows 266 which responds to the pressure drop $P_Q-P_R$ thereacross in such a manner that the pressure ratio $P_x/P_R$ across orifice 252 is maintained at a predetermined constant value. It has been found that (see copending U.S. application Serial No. 386,362, filed November 15, 1953, now Patent No. 2,858,700, in the name of Robert G. Rose and having a common assignee) with two restrictions in series, such as restriction 336 and orifice 252 in a conduit which is vented at one end thereof to a source of variable high fluid pressure $P_D$ and at the opposite end thereof to a source of variable low fluid pressure $P_R$, control of the ratio of fluid pressures across the second series restriction 252 to a substantially constant value results in the ratio of the areas $A_1/A_2$ being equal to and variable only as a predetermined function of the ratio of the source pressures $(P_D)/(P_R)$. $A_1$ and $A_2$ designate the areas of restriction 336 and orifice 252, respectively. This relationship may be expressed in the following form:

$$\frac{A_1}{A_2} = f\left(\frac{P_D}{P_R}\right) \text{ when } \left(\frac{Px}{P_R}\right) = \text{a constant}$$

where $f$ denotes a predetermined functional relationship. This relationship has been utilized in the design of the pressure ratio computer 44 so that the degree of displacement of bellows 266 and thus valve member 240 relative to the area of orifice 252 is always a predetermined function of the compressor pressure ratio $(P_D)/(P_R)$, which function may be varied as desired by varying the contour 246 of valve member 240.

The controlled constant pressure ratio $(P_x)/(P_R)$ is proportional to the effective area ratio of the upper and lower surfaces of cover plate 318 which are exposed to pressures $P_R$ and $P_x$, respectively. The particular desired value of pressure ratio $(P_x)/(P_R)$ for any given installation is selectable and may, for example, be varied by installing an inner bellows having a larger diameter or a smaller diameter, as desired.

For a further and more complete description of the operation of pressure ratio computer 44 reference is made to copending application Serial No. 574,691, filed March 29, 1956 in the name of E. A. Haase et al. (common assignee).

Operation

In the operation of the apparatus it will be assumed that the engine is idling at ground level under a ram ratio of 1.0. The term "ram ratio" is intended to mean the ratio of total or ram pressure $P_R$, which pressure is equivalent to the velocity pressure plus the static pressure of the air entering the compressor inlet to the ambient air pressure $P_A$ which pressure is equivalent to the static pressure at the compressor inlet. This ratio may be shown by the relationship $P_R/P_A$. The A dimension of metering port 84 is fixed by the governor portion of control 92 and the B dimension by the modulated compressor discharge pressure $P_m$ only since a ram ratio correction is not applied at this time. The by-pass valve 94 responds according to the fuel pressure differential across diaphragm 120 to maintain the aforementioned constant pressure differential across metering port 84. Referring to FIGURE 3, compressor discharge pressure $P_D$ is transmitted to the interior of bellows 314 at a controlled pressure $P_x$. Compressor inlet or ram air pressure $P_R$ is communicated to the exterior of bellows 314 through conduit 56, passage 310 and chamber 262. A predetermined constant pressure ratio $P_x/P_R$ is maintained across cover plate 318 and orifice 252 by means of bellows 266 which responds to the servo valve 292 controlled pressure $P_Q$ to position valve 240 in orifice 252, thereby establishing a particular orifice 252 area. The orifice 252 area controls the pressure $P_x$ level by bleeding compressor discharge pressure $P_D$ from bore 230 through passage 340 to chamber 262 at pressure $P_R$. A definite orifice 252 area will exist for any given compressor pressure ratio $P_D/P_R$ such that the predetermined constant pressure ratio $P_x/P_R$ across orifice 252 and cover plate 318 will be maintained. The degree of displacement of valve 240 also determines the effective area of orifice 250, which bleeds pressure $P_D$ from bore 230 to passage 346 to control the level of pressure $P_m$ communicated to chamber 154 from bore 230 via passage 345 and passage 184. Compressor inlet pressure $P_R$ is communicated from the engine through passages 56 and 310, to chamber 262 from which it flows to the interior of bellows member 204 and chamber 156 via the aforementioned circuitry. Since the ram ratio $P_R/P_A$ is 1.0, a zero differential occurs across bellows 204. The modulated pressure $P_m$ bellows 176 contracts in response to pressure $P_m$ to rotate lever 186 in a counterclockwise direction which in turn positions flapper valve 172 relative to valve seat 174. The variable volume chamber 166 pressure $P_s$ acts to urge piston 160 against spring 196 thus tending to rotate lever 186 in a clockwise direction. When a balance of forces exists against lever 186 the piston 160 will assume a fixed position. The metering valve 82 being connected to piston 160 by means of the rack 118 and pinion 114 will be rotated in a counterclockwise direction, when viewed from the pinion end of the valve, to correspondingly adjust the B dimension of metering port 84.

To accelerate the engine to maximum speed, the throttle lever 104 is manually actuated to a position corresponding to the desired speed. The acceleration portion of control 106 functions to position metering valve 82 axially such that a maximum A dimension of metering port 84 exists. The by-pass valve 94 will move towards a closed position in order to re-establish the required constant pressure differential across metering port 84. The engine will then begin to accelerate as a result of the increased fuel flow. As engine speed increases, compressor discharge pressure $P_D$ also increases and causes a subsequent unbalancing of the $P_x/P_R$ pressure ratio across cover plate 318. Pressure $P_x$ will increase and cause bellows 314 to expand, thus displacing half-ball 304 towards valve seat 302 which in turn reduces the amount of air at pressure $P_D$ vented from passage 282 and causes an increase in pressure $P_Q$ within bellows 266. As bellows 266 expands, valve 240 is repositioned, such that the change in orifice 252 area causes a greater bleed off of pressure $P_x$ therethrough to compressor inlet pressure $P_R$. The predetermined pressure ratio $P_x/P_R$ across cover plate 318 will be re-established and bellows 314 will remain in position until the ratio is again unbalanced. Since the compressor pressure ratio $P_D/P_R$ is continuously increasing as the engine accelerates, the action of valve 240 is essentially that of constant movement in order to provide the proper orifice 252 area and thus maintain the ratio $P_x/P_R$ constant. As valve 240 moves to increase the area of orifice 252, a subsequent decrease in orifice 250 area occurs, which decrease varies the pressure $P_m$ communicated to chamber 154, such that the rotational position of metering valve is varied to change the B dimension of metering port 84 which in turn controls fuel flow to cause the engine to accelerate along the dotted line $a$ of FIGURE 4. As the engine approaches maximum speed, the governor portion of control 106 functions to control the axial position of metering valve 82, thus varying the A dimension such that fuel flow is decreased to control engine operation along curve $f$ to point E on the required-to-run fuel flow curve, at which point the engine will operate at maximum speed under steady state conditions.

Now it is to be assumed that the aircraft is air-borne and that the engine is accelerating from point A on curve $b$ to point E on the required-to-run curve at a ram ratio of 1.4. Under these conditions, the axial opening of metering port 84 is wide open in response to the governor portion of control 106 according to the selected engine speed of point E. The rotational position of metering valve 82 is determined by the modulated pressure $P_m$ in the manner heretofore described. Although, in this case, the $P_m$ signal is modified by an applied ram ratio correction. The bellows 176 contracts in response to the pressure $P_m$ and causes a counterclockwise rotation of lever 186 which movement is opposed by the action of bellows 204 acting through links 213 and 220. The bellows 204 expands in response to the increased $P_R-P_A$ pressure differential appearing thereacross to actuate link 213 in a clockwise direction which movement is transmitted through the connecting link 220 to lever 186 which in turn is urged in a clockwise direction in opposition to the bellows 176 applied force. The resulting force acts to rotate lever 186 in a counterclockwise direction which in turn actuates flapper valve 172 toward valve seat 174 and causes an increase in variable volume chamber 166 pressure. Piston 160 responds to the increase in pressure $P_s$ and moves against the force of spring 196 which force also acts against lever 186 until the spring 186 force balances against the bellows 176 applied force. As engine acceleration progresses subsequent increases in modulated pressure $P_m$ applied force will be effected by the ram ratio bellows applied force until point B on the curve b of FIGURE 4 is reached. At point B the major portion of the critical stall area has been passed and the engine will tolerate additional fuel. At this time, valve member 240 will have been displaced to a position whereby the enlarged diameter portion of the valve slidingly engages orifice 248 to disestablish communication between pressure $P_R$ and bellows 204. The $P_R$ pressure within bellows 204 is subsequently vented to chamber 156 thereby allowing the $P_R - P_A$ pressure differential to decrease to zero. The engine will accelerate from point B along curve b' to point C as the $P_R - P_A$ differential decreases to zero, after which point the ram ratio correction is no longer applied. The engine will continue to accelerate along curve a to point D at which point the governor portion of control 106 functions to decrease the A dimension of metering port 84 such that the fuel is scheduled along curve f to point E on the required-to-run curve.

The curves g and h of FIGURE 4 represent conditions at a ram ratio of 1.6 and 2.0, respectively. The ram ratio correction as applied by bellows 204 to the modulated pressure $P_m$ signal in each of the above mentioned cases will cause a decrease in the engine acceleration fuel flow in the manner heretofore described. In each case the ram ratio correction cut-out will be initiated at a compressor pressure ratio $P_D/P_R$ corresponding to point B on curve b and will be cancelled at a compressor pressure ratio $P_D/P_R$ corresponding to point C on curve a.

Although the differential between compressor inlet ram air pressure $P_R$ and ambient air pressure $P_A$ decreases with increasing altitude, the ram ratio device 46 will function to apply the ram ratio correction heretofore described in accordance with the relationship $$W_f = K\left[ P_D - CP_A\left(\frac{P_R}{P_A} - 1\right)\right]$$

regardless of the altitude at which the engine is operating.

Although only one embodiment of the invention has been illustrated, it is obvious that various changes or arrangements may be made without departing from the spirit of the invention.

I claim:

1. In an aircraft fuel system for a gas turbine engine having a compressor and a combustion chamber, a conduit for delivering fuel from a source of supply to said combustion chamber, a valve in the conduit for controlling the fuel flow to said combustion chamber, means responsive to a control pressure derived from an air pressure in the engine, said valve being operatively connected to and positioned by said means such that a predetermined fuel flow schedule which varies as a function of said control pressure is supplied to said combustion chamber during an acceleration of the engine, first means responsive to first and second variable fluid pressures which vary as a function of aircraft flight velocity and flight altitude, respectively, said first means being operably connected to said valve means and arranged to cause a modification in said predetermined fuel flow schedule in accordance with the ratio of said first and second variable fluid pressures during an acceleration of the engine, and second means operably connected to said first means, said second means being actuated as a function of compressor pressure ratio to render said first means inoperative at a predetermined compressor pressure ratio.

2. In a fuel system for a gas turbine engine as claimed in claim 1 wherein said first fluid pressure is compressor ram air pressure.

3. In a fuel system for a gas turbine engine as claimed in claim 1 wherein said first fluid pressure is compressor ram air pressure and said second pressure is ambient air pressure.

4. In an aircraft fuel system for a gas turbine engine having a compressor operating between variable inlet and discharge air pressures and a combustion chamber, a conduit for delivering fuel from a source of supply to said combustion chamber, first means for varying the flow of fuel through said conduit according to a ratio of said inlet and discharge pressures, second means for modifying the flow of fuel through said conduit according to a relationship between said inlet pressure and engine ambient air pressure, said inlet air pressure normally being in excess of said engine ambient air pressure and varying as a function of the flight velocity of the aircraft, said first means including means operably connected to said second means for rendering said second means inoperative during a predetermined period of engine operation.

5. In a fuel system for a gas turbine engine having a compressor and a combustion chamber, a conduit for delivering fuel from a source to said combustion chamber, the combination of a fuel regulating member in the conduit for controlling the fuel flow therethrough to said combustion chamber, first means responsive to a control fluid pressure operatively connected to said fuel regulating member, control means responsive to compressor inlet and discharge air pressures, said control means having a fluid connection with said control fluid pressure and being in flow controlling relationship therewith for modulating said control fluid pressure as a function of the ratio of compressor inlet and discharge pressures, and second means responsive to compressor inlet air pressure and engine ambient air pressure operatively connected to said fuel regulating member, said fuel regulating member being actuated by said first means as a function of said control fluid pressure to maintain a predetermined fuel flow schedule to said combustion chamber, said fuel regulating member being actuated by said second means as a function of the ratio of said compressor inlet and engine ambient air pressures to cause a modification in said predetermined fuel flow schedule in accordance with limits established by the compressor stall characteristics of said engine.

6. In a fuel system for a gas turbine engine having an air intake and a characteristic range of unstable operation, a compressor adapted to receive air from the air intake, a combustion chamber, a conduit for delivering pressurized fuel to said combustion chamber, the combination of a fuel regulating member in said conduit for controlling the fuel flow therethrough to said combustion chamber, force responsive means operatively connected to said fuel regulating member for controlling the position of said fuel regulating member in said conduit, first force producing means responsive to a control fluid pressure derived from a pressure in the engine, said first force producing means being operatively connected to said force responsive means, control means operatively connected to separate air pressure sources associated with the compressor and responsive to the ratio of air pressures between said separate sources, said control means having an operative connection with said control fluid pressure whereby said control fluid pressure is modulated as a function of said pressure ratio, and second force producing means responsive to compressor inlet and engine ambient air pressures, said second force producing means being operatively connected to said first force producing means such that said forces act in opposition to one another to effect a resultant force, said force responsive means responding to said resultant force and controlling said fuel regulating member and thus the fuel flow to the combustion chamber in accordance with limits established by said characteristic range of unstable operation.

7. In a fuel system for a gas turbine having a compressor and a combustion chamber, a conduit for delivering fuel from a source to said combustion chamber, the combination of a fuel regulating member in the conduit for controlling the fuel flow therethrough to said combustion chamber, first means responsive to a control fluid pressure derived from an air pressure in the engine, second means responsive to ram and static pressures of the air entering said compressor, a pivot lever operatively connected to said first and second means and said fuel regulating member for controlling the position of said fuel regulating member and thus fuel flow as a function of said control fluid pressure and the ratio of said ram and static pressures, control means responsive to compressor inlet and discharge pressures including valve means actuable as a function of the ratio of said compressor inlet and discharge pressures, said valve means being operatively connected with said control fluid pressure and said ram pressure for modulating said control fluid pressure and said ram pressure as a function of said ratio of compressor inlet and discharge pressures, said pivot lever being pivoted in one direction to cause an increase in fuel flow in accordance with an increase in control fluid pressure and pivoted in the opposite direction to cause a decrease in fuel flow in accordance with an increase in the ratio of ram and static pressures.

8. In a fuel system for a gas turbine engine having a compressor and a combustion chamber, a conduit for delivering fuel from a source to said combustion chamber, the combination of a fuel regulating member in said conduit for controlling the fuel flow therethrough to said combustion chamber, first means responsive to a control fluid pressure which varies as a function of compressor discharge pressure, said first means having an operative connection with said fuel regulating member for controlling the position of said fuel regulating member as a function of said control fluid pressure, second means having separate fluid connections with and being responsive to ram and static pressures of the air entering said compressor, said second means having an operative connection with said fuel regulating member for controlling the position of said fuel regulating member as a function of the ratio of said ram and static pressures, valve means operatively connected to one of said separate fluid connections for interrupting the flow of air at ram pressure to said second means, and ratio measuring means responsive to inlet and discharge pressures of the compressor, said valve means having an operative connection with said ratio measuring means whereby said valve means is positioned to interrupt the flow of air at ram pressure to said second means at a predetermined ratio of said inlet and discharge pressures.

9. In a fuel system for a gas turbine engine having a compressor for pressurizing air from a relatively low pressure to a relatively high pressure, a combustion chamber, a conduit for delivering fuel from a source to said combustion chamber, the combination of a valve in the conduit for controlling the fuel flow therethrough to said combustion chamber, first means having a fluid connection with said relatively high pressure and being operatively connected to said valve, said valve being positioned by said first means as a function of said relatively high air pressure, second means having separate fluid connections with said relatively low air pressure and engine ambient air pressure and being arranged to sense a relationship between said relatively low and engine ambient air pressures, said valve being operatively connected to and actuated by said second means as a function of said sensed relationship, and control means disposed in said fluid connection and said relatively low air pressure fluid connection for modulating said relatively high air pressure and said relatively low air pressure, said control means being operable as a function of the ratio of said relatively high and relatively low air pressures, said valve being controlled by said first and second means to cause said engine to accelerate in response to a predetermined fuel flow schedule in accordance with limits established by the stall characteristics of the engine.

10. In a fuel system for a gas turbine engine having an air intake, an air compressor in series with said air intake, a combustion chamber, and a conduit for delivering fuel from a source to said combustion chamber, the combination of a fuel regulating member in the conduit for controlling the fuel flow therethrough, first pressure responsive means, a fluid connection communicating said first pressure responsive means with a compressor generated air pressure, a passage communicating said fluid connection with a source of drain pressure, valve means for controlling air flow between said fluid connection and said passage, second pressure responsive means having separate fluid connections with intake ram air pressure and ambient air pressure and being responsive to the pressure difference therebetween, a valve member in said ram air pressure connection for interrupting the flow of air therethrough, and compressor pressure ratio measuring means, said valve means and said valve member being operatively connected to and actuated by said compressor pressure ratio measuring means such that said compressor generated air pressure is modulated as a function of compressor pressure ratio over the operating range of the engine and said valve member is moved to a closed position at a predetermined compressor pressure ratio, and linkage means operatively connected to said first and second pressure responsive means and said fuel regulating member for controlling the position of said fuel regulating member and thus fuel flow as a function of said modulated compressor generated air pressure over the entire operating range of the engine and as a function of the ratio of ram air pressure and ambient air pressure over a portion of the operating range of the engine.

11. In a fuel system for a gas turbine engine having a compressor and a combustion chamber, a fuel pump, a conduit connected to deliver fuel from said fuel pump to said combustion chamber, the combination of a fuel regulating member in said conduit for controlling the fuel flow therethrough to said combustion chamber, first means responsive to a control fluid pressure which varies as a function of a variable condition of engine operation, said first means being operatively connected to said fuel regulating member for controlling the position of said fuel regulating member as a function of said control fluid pressure, second means responsive to ram and ambient pressures of the air entering said compressor, said second means being operatively connected to said fuel regulating member and controlling the position of said fuel regulating member as a function of the ratio of said ram and ambient pressures and third means responsive to compressor pressure ratio operatively connected to said second means and operative to render said second means inoperative at a predetermined compressor pressure ratio.

References Cited in the file of this patent

UNITED STATES PATENTS

| 2,765,619 | Peterson | Oct. 9, 1956 |
| 2,895,692 | Leduc | July 1, 1959 |

FOREIGN PATENTS

| 1,054,998 | France | Oct. 14, 1953 |
| 743,859 | Great Britain | Jan. 25, 1956 |